United States Patent
Lee et al.

(10) Patent No.: US 10,374,209 B2
(45) Date of Patent: Aug. 6, 2019

(54) RECHARGEABLE BATTERY

(71) Applicant: SAMSUNG SDI CO., LTD., Yongin-si, Gyeonggi-do (KR)

(72) Inventors: Chi-Young Lee, Yongin-si (KR); Myung-Jae Jang, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 763 days.

(21) Appl. No.: 14/880,017

(22) Filed: Oct. 9, 2015

(65) Prior Publication Data

US 2016/0293908 A1  Oct. 6, 2016

(30) Foreign Application Priority Data

Apr. 6, 2015  (KR) .................. 10-2015-0048279

(51) Int. Cl.
    *H01M 2/30*  (2006.01)
(52) U.S. Cl.
    CPC .................... *H01M 2/30* (2013.01)
(58) Field of Classification Search
    CPC ....................................................... H01M 2/30
    See application file for complete search history.

(56) References Cited

U.S. PATENT DOCUMENTS

| 6,248,473 B1 * | 6/2001 | Lonsberry | H01M 2/0225 429/163 |
| 6,579,640 B1 * | 6/2003 | Nagase | H01M 2/06 429/178 |
| 7,887,943 B2 | 2/2011 | Yoshikane et al. | |
| 9,843,031 B2 * | 12/2017 | Jang | H01M 2/30 |
| 2003/0027044 A1 * | 2/2003 | Asahina | H01M 2/22 429/179 |
| 2006/0105624 A1 * | 5/2006 | Yoshikane | H01M 2/202 439/500 |
| 2009/0162747 A1 * | 6/2009 | Zhu | H01M 10/615 429/160 |
| 2010/0159291 A1 * | 6/2010 | Kim | B23K 37/0443 429/7 |

(Continued)

FOREIGN PATENT DOCUMENTS

| KR | 10-1026925 B1 | 4/2011 |
| KR | 10-2012-0098001 | 9/2012 |

OTHER PUBLICATIONS

U.S. Office Action dated Apr. 6, 2017, issued in U.S. Appl. No. 14/826,757 (10 pages).

*Primary Examiner* — Michael L Dignan
(74) *Attorney, Agent, or Firm* — Lewis Roca Rothgerber Christie LLP

(57) ABSTRACT

A rechargeable battery includes an electrode assembly having a first electrode and a second electrode on either side of a separator, a case accommodating the electrode assembly, a cap plate sealing the case and electrically connected to the second electrode, a first terminal electrically connected to the first electrode and located with a terminal hole of the cap plate, and a second terminal directly connected to the cap plate, wherein the second terminal includes a spacing part spaced from the cap plate and configured to be connected to a bus bar, and a connection part connected to the spacing part through a round part and connected to the cap plate, wherein a curvature radius of an outer surface of the round part is less than a first thickness of the connection part.

5 Claims, 7 Drawing Sheets

(56) References Cited

U.S. PATENT DOCUMENTS

| | | | |
|---|---|---|---|
| 2011/0244310 A1 | 10/2011 | Kim | |
| 2012/0021277 A1* | 1/2012 | Byun | H01M 2/0469 |
| | | | 429/178 |
| 2012/0058389 A1* | 3/2012 | Guen | H01M 2/0237 |
| | | | 429/179 |
| 2012/0237802 A1* | 9/2012 | Byun | H01M 2/043 |
| | | | 429/53 |
| 2014/0377601 A1* | 12/2014 | Kim | H01M 2/34 |
| | | | 429/61 |
| 2015/0318519 A1* | 11/2015 | Tsutsumi | H01M 2/06 |
| | | | 429/158 |

* cited by examiner

RECHARGEABLE BATTERY

CROSS-REFERENCE TO RELATED APPLICATION

This application claims priority to and the benefit of Korean Patent Application No. 10-2015-0048279 filed in the Korean Intellectual Property Office on Apr. 6, 2015, the entire contents of which are incorporated herein by reference.

BACKGROUND

1. Field

The present invention relates to a rechargeable battery.

2. Description of the Related Art

Unlike a primary battery, a rechargeable battery can be repeatedly charged and discharged. A small capacity rechargeable battery may be used in small portable electronic devices such as a mobile phone, a laptop computer, and a camcorder, and a large capacity rechargeable battery may be used as a power source for driving a motor of a hybrid vehicle and the like.

Typically, a rechargeable battery includes an electrode assembly formed by configuring a positive electrode and a negative electrode at both surfaces of a separator, a case accommodating the electrode assembly, a cap plate closing and sealing an opening of the case, and an terminal installed in the cap plate and electrically connected to the electrode assembly.

Sometimes, the terminal includes a rivet terminal connected to the electrode assembly and installed in a terminal hole of the cap plate, and a plate terminal disposed outside the cap plate and connected to the rivet terminal. The plate terminal includes a hole coupled with a rivet terminal.

For example, the plate terminal is manufactured by forming an outer peripheral portion of the plate terminal by a forging process and forming a hole through a cutting process. Since there is a need for the forging process and the cutting process to manufacture the plate terminal, the cost to manufacture the plate terminal, that is, an electrode terminal, is increased, and productivity is deteriorated. This increases a cost of the rechargeable battery.

Further, if the plate terminal is manufactured by a press process, a curvature radius substantially greater than a thickness of a plate terminal is formed at an edge part of the plate terminal. Accordingly, since mechanical strength of the plate terminal is deteriorated, and the plate terminal is spaced from a bus bar at a round part, a contact area between the plate terminal and the bus bar is reduced. In order to ensure stable mechanical strength and low electrical resistance, the plate terminal requires a large area.

The above information disclosed in this Background section is only for enhancement of understanding of the background of the invention and therefore it may contain information that does not form the prior art that is already known in this country to a person of ordinary skill in the art.

SUMMARY

Embodiments of the present invention provide a rechargeable battery having stable mechanical strength and low electrical resistance at an electrode terminal manufactured by a press process and further provide a rechargeable battery including an electrode terminal for increasing a contact area with a bus bar. An exemplary embodiment of the present invention provides a rechargeable battery including: an electrode assembly including a first electrode and a second electrode provided at respective surfaces of a separator; a case to receive the electrode assembly; a cap plate to close and seal an opening of the case and electrically connected to the second electrode; a first terminal electrically connected to the first electrode and provided at an outer portion of the cap plate through a terminal hole; and a second terminal directly connected to the cap plate, wherein the second terminal includes a spacing part spaced from the cap plate and connected to a bus bar, and a connection part connected to the spacing part through a round part and connected to the cap plate, wherein a curvature radius of an outer surface of the round part is less than a first thickness of the connection part.

The connection part may further include a flange bent at a side adjacent to the cap plate and making contact with the cap plate.

The flange may be formed at both sides in a width direction and both sides in a length direction of the cap plate in the spacing part.

The spacing part may include: a first part having a same first thickness as a thickness of the connection part; and a second part having a second thickness that is less than the first thickness at both sides of the first part in a width direction of the cap plate, and having a concave groove at an inner side connected to an inner surface of the connection part.

A maximum third thickness in a diagonal direction configured between an inner surface of the concave groove and an outer surface of the round part may be greater than the first thickness.

A width of the second part in one side may be a sum of a first distance of an outer surface corresponding to the concave groove and a second distance of an outer surface obtained by subtracting a curvature radius of an outer surface of the round part from the first thickness of the connection part.

The spacing part may include a first part having a same first thickness as a thickness of the connection part at both sides in a width direction of the cap plate, and a second part having a second thickness less than the first thickness between the first parts and forming a concave groove at an inner side.

A curvature radius of an outer surface in the round part to connect the first part to the connection part may be less than a curvature radius of an inner surface.

A fourth thickness having a maximum value in a diagonal direction configured between an inner surface of the round part and an outer surface of the round part may be greater than the first thickness.

A width of the first part may be a sum of a first distance of an outer surface corresponding to an inner surface of the connection part in the concave groove, and a second distance of an outer surface obtained by subtracting a curvature radius of the outer surface from a first thickness of the connection part.

As described above, in accordance with an exemplary embodiment of the present invention, since the spacing part of the terminal is connected to the connection part through the round part, a curvature radius of an outer surface of the round part is less than a first thickness of the connection part, so an area of the spacing part is increased.

In other words, since the spacing part having an increased area in the terminal is connected to the bus bar, a contact area between the bus bar and the terminal is increased. Accord-

DETAILED DESCRIPTION

Figure 1:
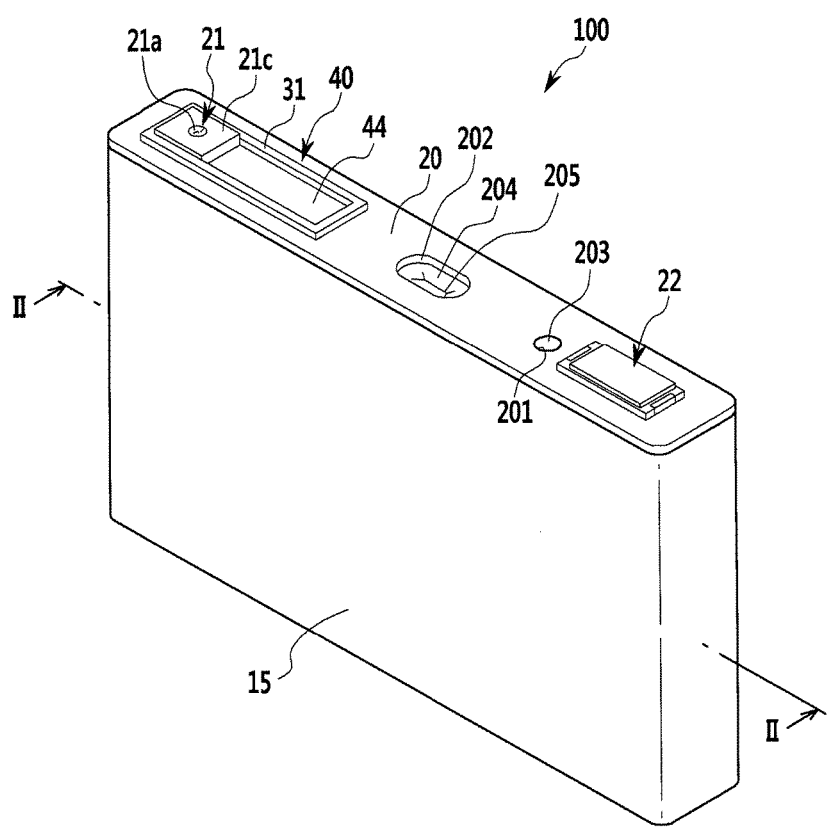
FIG. 1 is a perspective view illustrating a rechargeable battery according to a first exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

Figure 2:
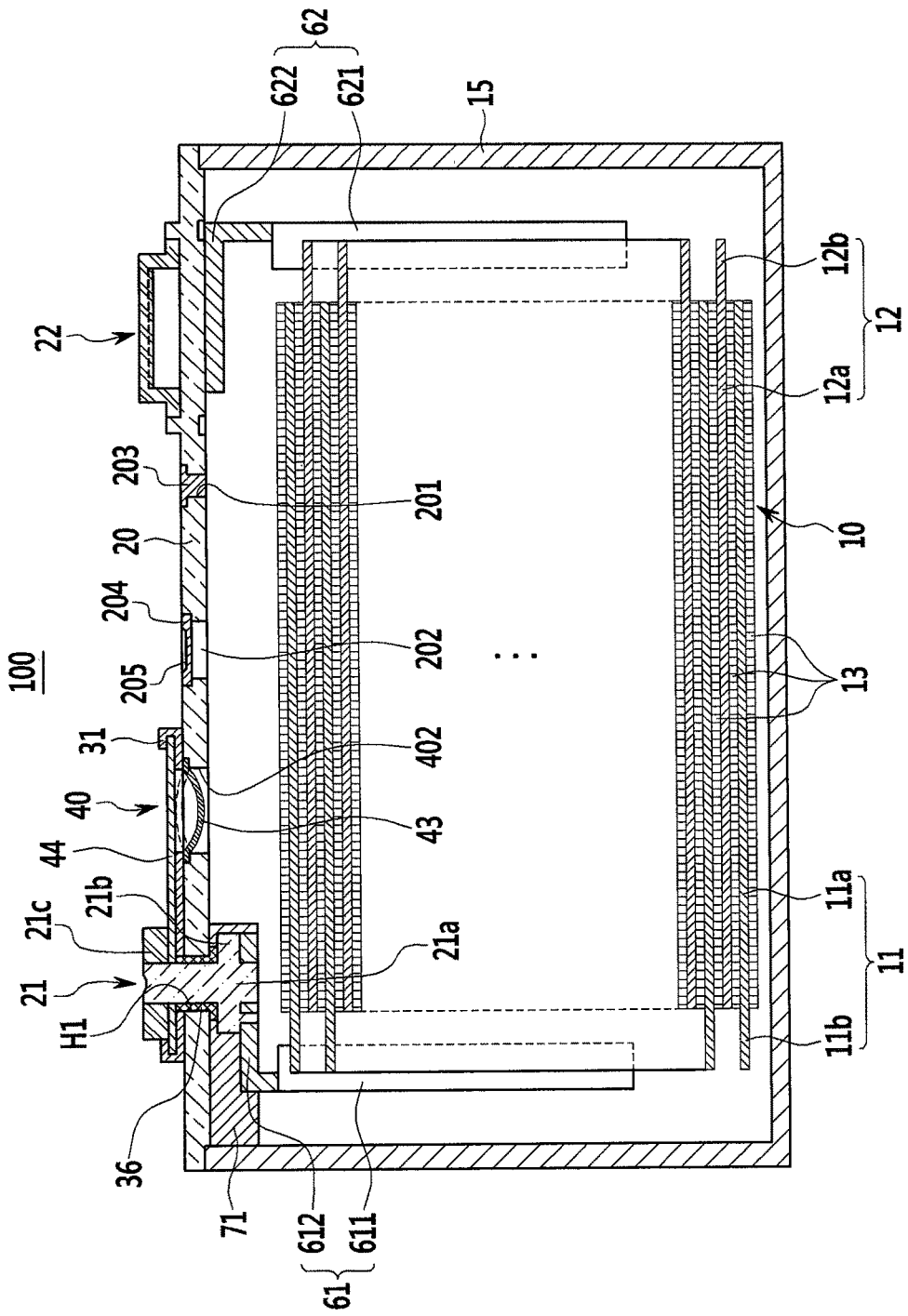
FIG. 2 is a cross-sectional view illustrating the rechargeable battery taken along line II-II of FIG. 1.

FIG. 1 is a perspective view illustrating a rechargeable battery according to a first exemplary embodiment of the present invention, and FIG. 2 is a cross-sectional view illustrating the rechargeable battery taken along line II-II of FIG. 1. Referring to FIG. 1 and FIG. 2, the rechargeable battery 100 according to the first exemplary embodiment includes an electrode assembly 10 performing charge and discharge, a case 15 accommodating the electrode assembly 10 therein, a cap plate 20 closing and sealing the case 15, a first terminal 21 (referred to as "negative terminal" for convenience) installed in a terminal hole H1 of the cap plate 20, and a second terminal 22 (referred to as "positive terminal" for convenience) connected to an outer surface of the cap plate 20.

The electrode assembly 10 is formed by locating a first electrode 11 (referred to as "negative electrode" for convenience) and a second electrode 12 (referred to as "positive electrode" for convenience) at respective surfaces of a separator 13 being an insulator, and by spirally winding the negative electrode 11, the separator 13 and the positive electrode 12 to have a jelly roll shape.

The negative electrode 11 and the positive electrode 12 include coated regions 11a and 12a obtained by coating a current collector formed of a metal thin plate with an active material and uncoated regions 11b and 12b including an exposed current collector which is not coated with an active material.

The uncoated region 11b of the negative electrode 11 is formed at one end of the negative electrode 11 along the spiral-wound negative electrode 11. The uncoated region 12b of the positive electrode 12 is formed at one end of the positive electrode 12 along the spiral-wound positive electrode 12. Accordingly, the uncoated regions 11b and 12b of the negative electrode and the positive electrode 11 and 12 are located at respective ends of the electrode assembly 10.

The negative electrode 11 is electrically insulated from the cap plate 20 through an external short-circuit part 40. When internal pressure of the rechargeable battery 100 is increased, the rechargeable battery 100 may be short-circuited to the cap plate 20 by operating the external short-circuit part 40. In contrast, the positive electrode 12 is directly electrically connected to the cap plate 20. In other words, the cap plate 20 and the case 15 are positively charged.

For example, the case 15 has a substantially cuboid shape to configure the electrode assembly 10 and a space for receiving an electrolyte solution, and an opening to connect an internal space with the outside is formed at one surface thereof. The opening allows the electrode assembly 10 to be inserted into the case 15.

The cap plate 20 is coupled with the opening of the case 15 by welding in order to close and seal the opening the case 15. For example, the cap plate 20 and the case 15 are made of aluminum and may be welded together. Further, the cap plate 20 includes an electrolyte injection opening 201, a vent hole 202, and a short-circuit hole 402.

The electrolyte injection opening 201 is welded by coupling the cap plate 20 with the case 15, and an electrolyte solution may be injected into the case 15 therethrough. After injecting the electrolyte solution, the electrolyte injection opening 201 is sealed by a sealing stopper 203.

The vent hole 202 is closed and sealed by to a welded vent plate 204. If internal pressure of the rechargeable battery 100 reaches a predetermined pressure, the vent plate 204 is ruptured to open the vent hole 202 so that an explosion is prevented. A notch 205 for guiding rupture is formed in the vent plate 204.

The negative terminal 21 is installed in a terminal hole H1 of the cap plate 20 and is electrically connected to the negative electrode 11 of the electrode assembly 10. The negative terminal 21 includes a rivet terminal 21a installed in a terminal hole H1 of the cap plate 20, a flange 21b integrally formed on the rivet terminal 21a at an inner side of the cap plate 20, and a plate terminal 21c located at an outer side of the cap plate 20 and riveted or welded to the rivet terminal 21a.

A negative electrode gasket 36 is inserted between the rivet terminal 21a of the negative terminal 21 and an inner surface of the terminal hole H1 and electrically insulates them. The negative electrode gasket 36 also seals the rivet terminal 21a of the negative terminal 21 and the cap plate 20. The negative electrode gasket 36 further extends between the flange 21b and an inner surface of the cap plate 20 and to electrically insulate them, and seals a space between the flange 21b and the cap plate 20.

A negative electrode lead tab 61 electrically connects the negative terminal 21 to the uncoated region 11b of the negative electrode 11 of the electrode assembly 10. For example, the negative electrode lead tab 61 includes a bent current collecting part 611 and a connection part 612. The current collecting part 611 is welded to the uncoated region 11b of the electrode assembly 10, and the connection part 612 is connected to the rivet terminal 21a.

For example, the connection part 612 of the negative electrode lead tab 61 is connected to a bottom end of the rivet terminal 21a to have a conductive structure while being supported to the flange 21b by coupling the connection part 61 of the negative electrode lead tab 61 with a bottom end of the rivet terminal 21a to caulk the bottom end.

An internal insulator 71 is installed between the connection part 612 of the negative electrode lead tab 61 and the cap plate 20, and electrically insulates the connection part 612 of the negative electrode lead tab 61 from the cap plate 20. Further, one side of the internal insulator 71 is adhered to the cap plate 20, and an opposite side of the internal insulator 71 surrounds the connection part 612 of the negative electrode lead tab 61, the rivet terminal 21a, and the flange 21b, to stabilize a connection structure thereof.

The negative electrode gasket 36 further extends and is inserted between the rivet terminal 21a of the negative terminal 21 and the external short-circuit part 40 (for example, in a hole of a negative electrode insulator 31 corresponding to the terminal hole H1). The external short-circuit part 40 may be configured to maintain a spaced state or to be shorted according to internal pressure of the rechargeable battery 100.

The short-circuit part 40 includes a membrane 43 for closing and sealing the short-circuit hole 402 formed in the cap plate 20 and to be inverted according to internal pressure, and a short-circuit tab 44 electrically connected to the negative terminal 21 and spaced from one side of the membrane 43. The membrane 43 is welded in the short-circuit hole 402 to close and seal the short-circuit hole 402. The short-circuit tab 44 is installed between the negative electrode insulator 31 and the plate terminal 21c and extends on the membrane 43.

When the rechargeable battery 100 is normally operated, a space is maintained between the short-circuit tab 44 and the membrane 43. When internal pressure of the rechargeable battery 100 is increased, the membrane 43 is inverted so that the short-circuit tab 44 is short-circuited. Accordingly, since the membrane 43 is short-circuited outside the electrode assembly 10, a current charged in the electrode assembly 10 may be stably discharged outside the electrode assembly 10.

Since the cap plate 20 is positively charged, the short-circuit tab 44 of the external short-circuit part 40 and the rivet terminal 21a of the negative terminal 21 is installed on the cap plate 20 by interposing a negative electrode insulator 31. The negative electrode insulator 31 includes holes corresponding to a terminal hole H1 and the short-circuit hole 402 to prevent interruption of the installation of the rivet terminal 21a and inversion of the membrane 43.

A positive electrode lead tab 62 is electrically connected to the uncoated region 12b of the positive electrode of the electrode assembly 10. For example, the positive electrode lead tab 62 includes a bent current collecting part 621 and a connection part 622. The current collecting part 621 is welded to the uncoated region 12b of the electrode assembly 10, and the connection part 622 is welded to an inner surface of the cap plate 20.

The positive terminal 22 is directly connected to the cap plate 20 which is positively charged. Accordingly, the positive terminal 22 is electrically connected to the positive electrode 12 of the electrode assembly 10 through the cap plate 20 and the positive electrode lead tab 62. Therefore, the electrode assembly 10 is drawn out the case 14 through the negative terminal 21 and the positive terminal 22.

Figure 3:
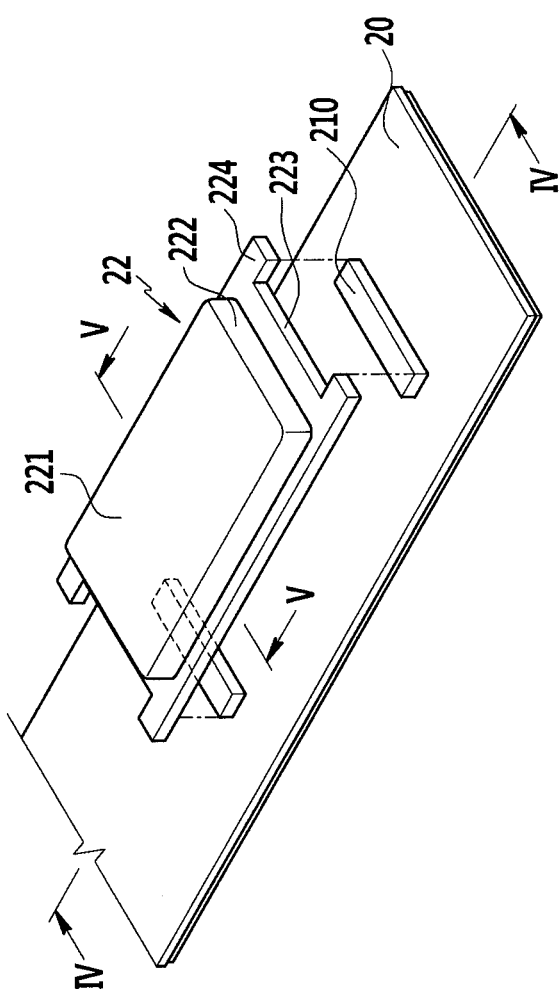
FIG. 3 is an exploded perspective view illustrating a cap plate and a terminal shown in FIG. 1.
Figure 4:
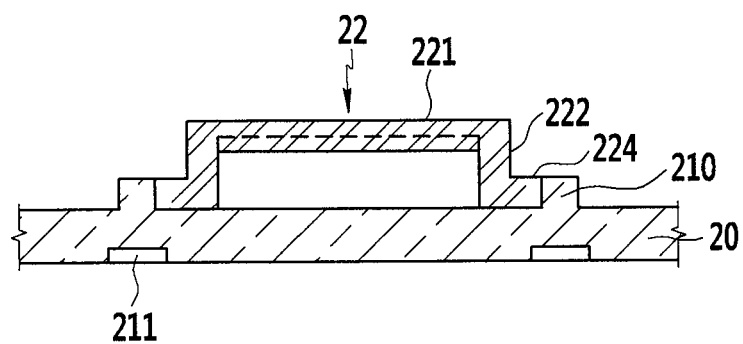
FIG. 4 is a cross-sectional view of coupling of the cap plate of FIG. 3 with the terminal taken along line IV-IV.
Figure 5:
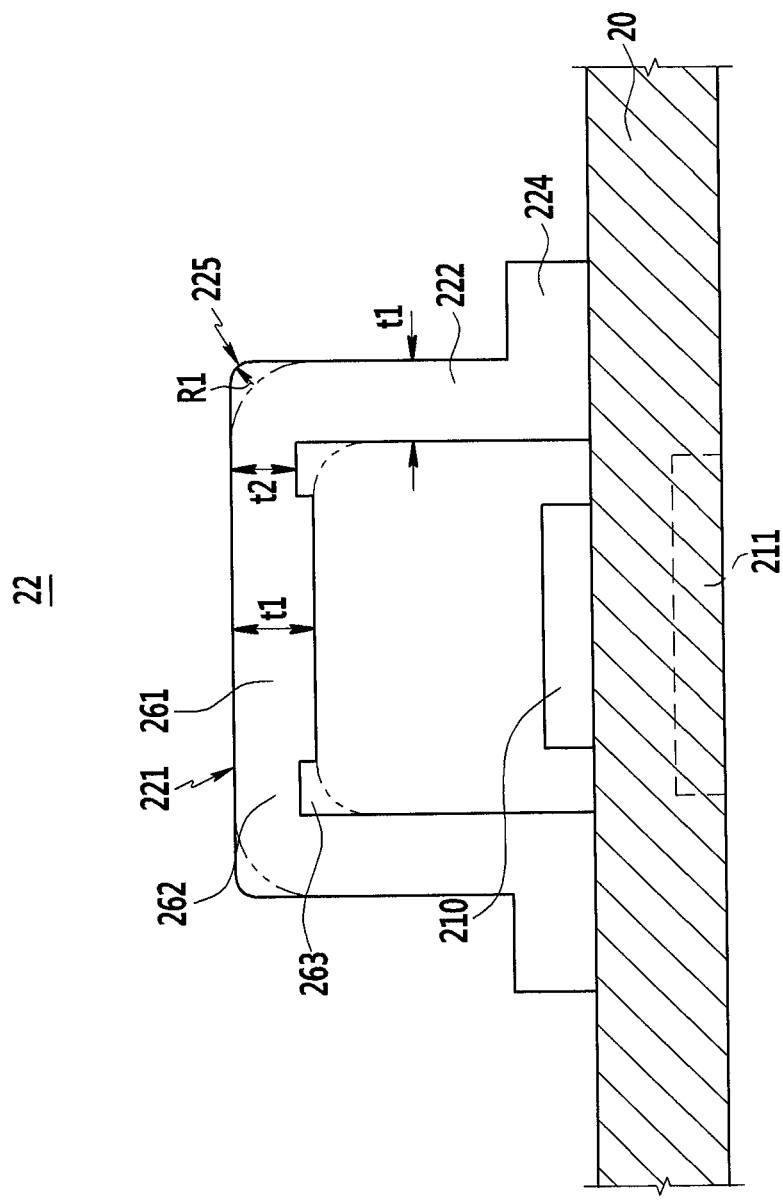
FIG. 5 is a cross-sectional view of coupling of the cap plate of FIG. 3 with the terminal taken along line V-V.

FIG. 3 is an exploded perspective view illustrating a cap plate and a terminal shown in FIG. 1, FIG. 4 is a cross-sectional view of coupling of the cap plate of FIG. 3 with the terminal taken along line IV-IV, and FIG. 5 is a cross-sectional view of coupling of the cap plate of FIG. 3 with the terminal taken along line V-V.

Referring to FIG. 3 to FIG. 5, the positive terminal 22 includes a spacing part 221 spaced from the cap plate 20 and connected to a bus bar 300 (see FIG. 6), and a connection part 222 connected to the spacing part 221 through a round part 225 (FIG. 5) and connected to the cap plate 20. For example, the connection part 222 may further include a flange 224 connected to an adjacent side of the cap plate 20 and making contact with the cap plate 20. The flange 224 may increase a contact area with the cap plate 20 to stabilize electrical connection and mechanical strength.

The flange 224 includes a coupling part 223 defined by a concave groove, and is coupled with a corresponding coupling portion 210 formed at the cap plate 20 by the coupling part 223. Therefore, when the positive terminal 22 is put on the cap plate 20 in order to weld the positive terminal 22 to the cap plate 20, rotation of the positive terminal 22 is prevented, so a position may be stably fixed. Since the coupling part 223 is formed when forming the positive terminal 22 by a drawing or press process, there is no separate process.

The corresponding coupling portion 210 may be formed as a protrusion protruding to an outer surface of the cap plate 20 by press-processing the cap plate 20 corresponding to the concave groove. A pressing groove 211 for forming the corresponding coupling portion 210 is provided at an inner surface of the cap plate 20. The protrusion of the correspondence 210 is coupled with the concave coupling part 223 formed at the flange 224.

Referring to FIG. 5, in the positive terminal 22, a curvature radius R1 of an outer surface of the round part 225 is less than a first thickness t1 of the connection part 222. For example, the spacing part 221 includes a first part 261 having the same first thickness t1 as that of the connection part 222 and a second part 262 having a second thickness t2 less than the first thickness t1 at both sides of the first part 261.

The second part 262 defines a concave groove 263 at an inner side connected to the inner surface of the connection part 222. After forming the connection part 222 and the spacing part 221, the concave groove 263 is formed so that a curvature radius R1 of the outer surface of the round part 225 is less than the first thickness t1 by additionally striking mutually connected parts. In other words, the positive terminal 22 is manufactured by an additional strike.

Figure 6:
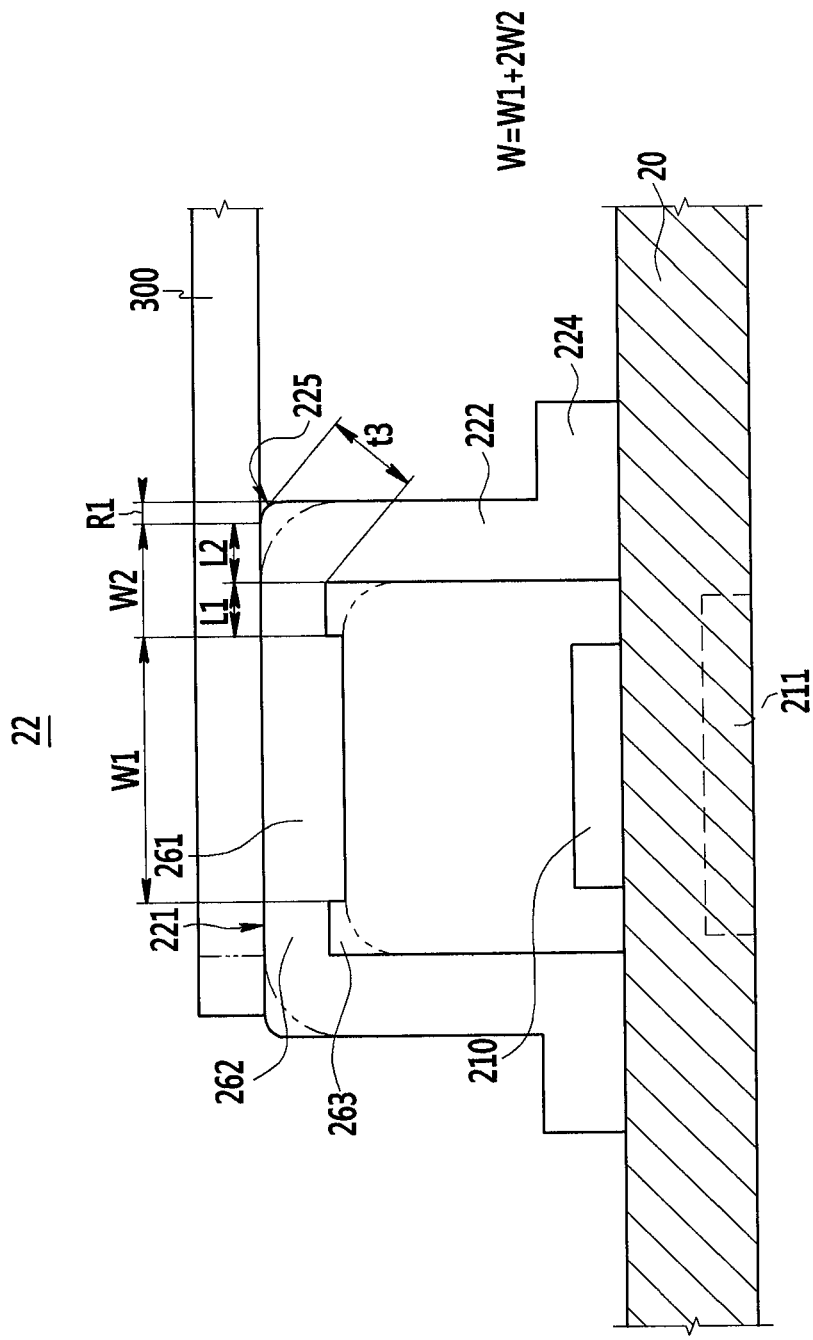
FIG. 6 is a cross-sectional view illustrating a state of a bus bar welded to a terminal of FIG. 5.

FIG. 6 is a cross-sectional view illustrating a state of a bus bar welded to a terminal of FIG. 5. Referring to FIG. 6, a third thickness t3 having a maximum value in a diagonal direction configured between an inner surface of the concave groove 263 and an outer surface of the round part 225 is greater than the first thickness t1.

The concave groove 263 is formed at an inner surface of the round part 225 due to the additional strike. However, the round part 225 is pushed to an outer surface so that the curvature radius R1 is reduced and the third thickness t3 is increased, and an entire width W of the spacing part 221 is increased. The increase of the third thickness t3 of the round part 225 increases mechanical strength of the positive terminal 22.

The entire width W of the spacing part 221 welded to the bus bar 300 is a sum of a first width W1 of the first part 261 and twice a second width W2 of the second part 262 (W=W1+2W2). The second width W2 of the second part 262 is a sum (W1=L1+L2) of a first distance L1 of an outer surface corresponding to the concave groove 263 and a second distance (L2=t1−R1) of an outer surface obtained by subtracting a curvature radius R1 of an outer surface of the round part 225 from the first thickness t1 of the connection part 222.

Before additionally striking the positive terminal 22 (imaginary line state of FIG. 6), the width W of the spacing part 221 is a sum of the first width W1 of the first part 261 and a first distance L1 of the second part 262 (W=W1+L1). In other words, the width W of the spacing part 221 in the positive terminal 22 of the first exemplary embodiment is increased by a second distance (L2=t1−R1).

Accordingly, the spacing part 221 increases a contact area with the bus bar 300 by the second distance (L2=t1−R1). In other words, when the positive terminal 22 is manufactured by a press process, the positive terminal 22 may have stable mechanical strength and low electrical resistance.

Hereinafter, a second embodiment of the present invention will be described. The same configurations as in the first exemplary embodiment will be omitted and only different parts will be described.

Figure 7:
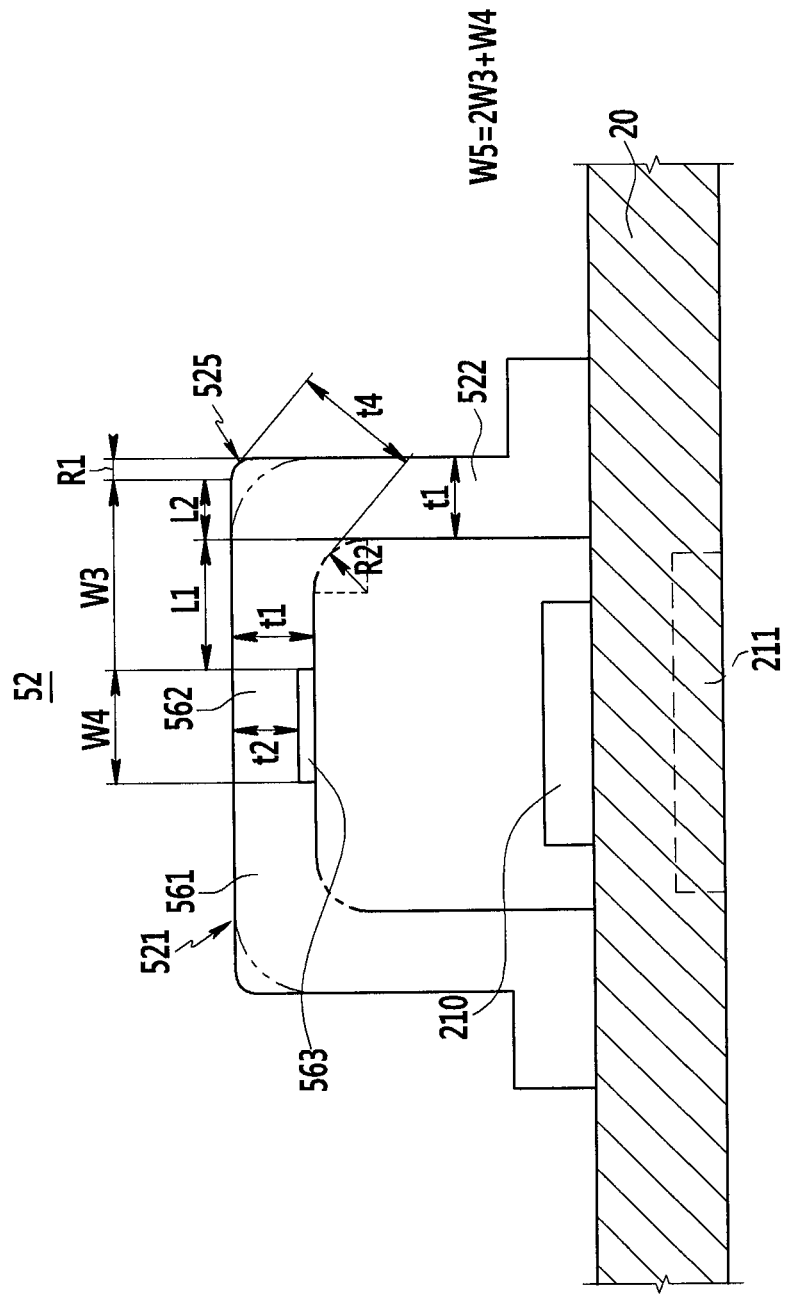
FIG. 7 is a cross-sectional view illustrating coupling and cutting the cap plate with the terminal in a rechargeable battery according to a second exemplary embodiment of the present invention.

FIG. 7 is a cross-sectional view illustrating by coupling and cutting the cap plate with the terminal in a rechargeable battery according to a second exemplary embodiment of the present invention. Referring to FIG. 7, in a positive terminal 52 of a rechargeable battery 200 according to the second exemplary embodiment, a spacing part 521 includes first parts 561 having the same first thickness t1 as a connection part 522 at both sides of a width direction of the cap plate 20, and a second part 562 having a second thickness t2 less than the first thickness t1 between the first parts 561.

The second part 562 forms a concave groove 563 at an inner side. After forming the connection part 522 and the spacing part 521, a concave groove 563 is formed so that a curvature radius R1 of the outer surface of the round part 525 in a round part 525 to connect the first part 561 to the connection part 522 is less than the first thickness t1 and a curvature radius R2 of an inner surface by additionally striking a center of the spacing part 521. In other words, the positive terminal 52 is manufactured by an additional strike.

A fourth thickness t4 having a maximum value in a diagonal direction configured between an inner surface of the round part 525 and an outer surface of the round part 525 is greater than the first thickness t1. The concave groove 563 is formed at an inner surface of the second part 562 due to the additional strike. However, the round part 525 is pushed to an outer surface so that the curvature radius R1 is reduced and the fourth thickness t4 is increased, and an entire width W5 of the spacing part 521 is increased. The increase of the fourth thickness t4 of the round part 525 increases mechanical strength of the positive terminal 52.

The entire width W5 of the spacing part 521 welded to the bus bar is a sum of twice a first width W1 of the first part 561 and a second width W4 of the second part 262 (W5=2W3+W4). The first width W3 of the first part 561 is a sum (W3=L1+L2) of a first distance L1 of an outer surface corresponding to an inner surface of the connection part 522 in the concave groove 563 and a second distance (L2=t1−R1) of an outer surface obtained by subtracting a curvature radius R1 of an outer surface from the first thickness t1 of the connection part 522.

Before additionally striking the positive terminal 52 (imaginary line state of FIG. 7), the width W of the spacing part 521 is a sum of the first distance L1 of the first part 561 and a second width W4 of the second part 562 (W5=L1+W4). In other words, the width W5 of the spacing part 521 in the positive terminal 52 of the second exemplary embodiment is increased by a second distance (L2=t1−R1).

Accordingly, the spacing part 521 increases a contact area with the bus bar by the second distance (L2=t1−R1). In other words, when the positive terminal 52 is manufactured by a press process, the positive terminal 52 may have stable mechanical strength and low electrical resistance.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

| | |
|---|---|
| 10: electrode assembly | 11: first electrode (negative electrode) |
| 11a, 12a: coated region | 11b, 12b: uncoated region |
| 12: second electrode (positive electrode) | 13: separator |
| 15: case | 20: cap plate |
| 21: first electrode (negative electrode) terminal | 21a: rivet terminal |
| 21b: flange | 21c: plate terminal |
| 22, 52: second electrode (positive electrode) terminal | |
| 36: negative electrode gasket | |
| 40: external short-circuit part | 43: membrane |
| 44: short-circuit tab | 61, 62: negative, positive electrode lead tab |
| 71: internal insulator | 100, 200: rechargeable battery |
| 201: electrolyte injection opening | 202: vent hole |
| 203: sealing stoppage | 204: vent plate |
| 205: notch | 210: corresponding coupling portion |
| 221, 521: spacing part | 222, 522: connection part |
| 223: coupling part | 224: flange |
| 225, 525: round part | 261, 561: first part |
| 262, 562: second part | 263, 563: concave groove |
| 300: bus bar | 402: short-circuit hole |
| 611, 621: current collecting part | 612, 622: connection part |
| H1: terminal hole | L1: first distance |
| L2: second distance | R1, R2: curvature radius |
| t1: first thickness | t2: second thickness |
| t3, t4: third, fourth thickness | W, W5: entire width of spacing part |
| W1, W3: first width | W2, W4: second width |

What is claimed is:

1. A rechargeable battery comprising:
an electrode assembly including a first electrode, a second electrode, and a separator between the first and second electrodes;
a case accommodating the electrode assembly;
a cap plate sealing the case and being electrically connected to the second electrode;
a first terminal being electrically connected to the first electrode and being located with a terminal hole of the cap plate; and
a second terminal being directly connected to the cap plate, wherein the second terminal comprises:
a spacing part spaced from the cap plate and a continuous planar exterior surface configured to be entirely connected to a bus bar, wherein the spacing part comprises:
a first part having a first thickness; and
a second part having a second thickness that is less than the first thickness at either side of the first part in a width direction of the cap plate, and having a concave groove at an inner side, and
a connection part connected to the spacing part through a round part and connected to the cap plate, wherein a curvature radius of an outer surface of the round part is less than a first thickness of the connection part, and wherein the concave groove of the spacing part is connected to an inner surface of the connection part.

2. The rechargeable battery of claim 1, wherein the connection part further comprises a flange bent at a side adjacent to the cap plate and contacting the cap plate.

3. The rechargeable battery of claim 2, wherein the flange extends in a width direction and in a length direction of the cap plate in the spacing part.

4. The rechargeable battery of claim 1, wherein the second terminal has a third thickness in a diagonal direction between an inner surface of the concave groove and an outer surface of the round part that is greater than the first thickness.

5. The rechargeable battery of claim 1, wherein a width of the second part on one side is equal to a sum of a first distance of an outer surface corresponding to the concave groove and the first thickness of the connection part less a curvature radius of an outer surface of the round part.

* * * * *